T. A. EDISON.
FEED MECHANISM FOR PHONOGRAPHS AND OTHER MACHINES.
APPLICATION FILED JAN. 17, 1907.
936,267.  Patented Oct. 5, 1909.
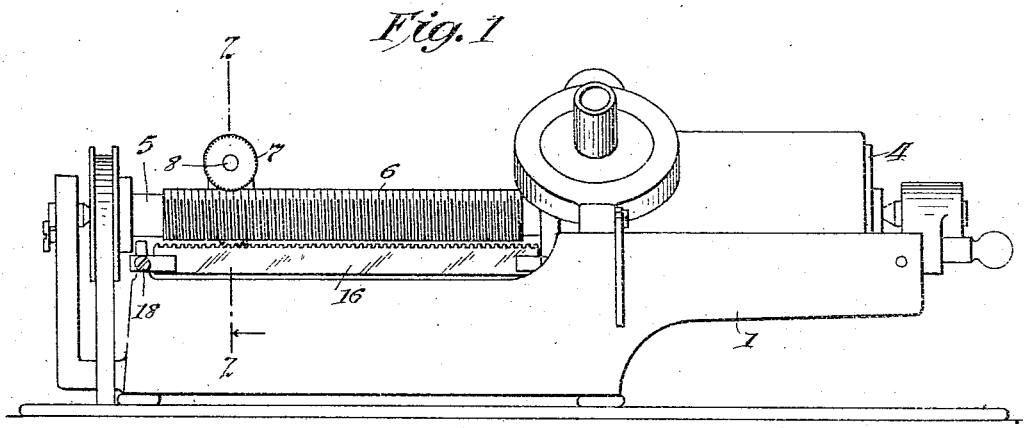
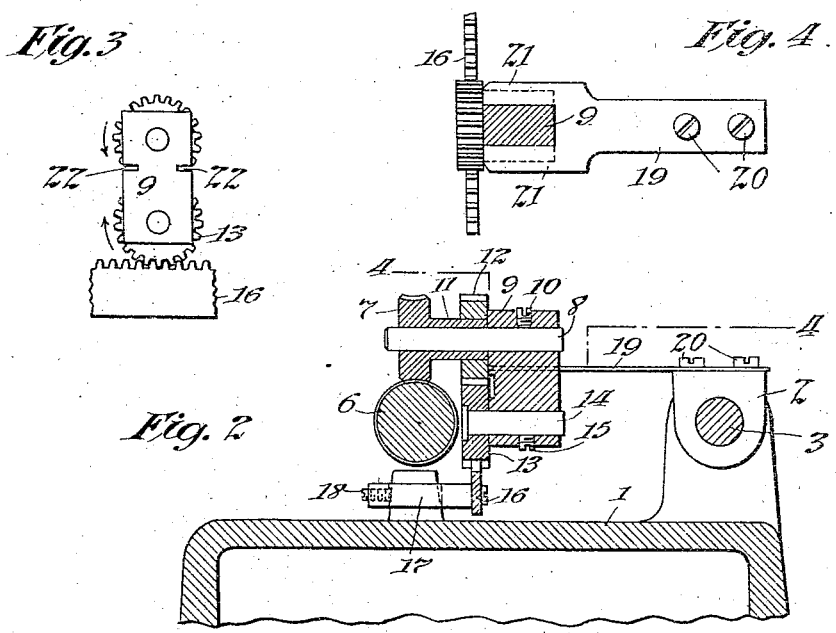
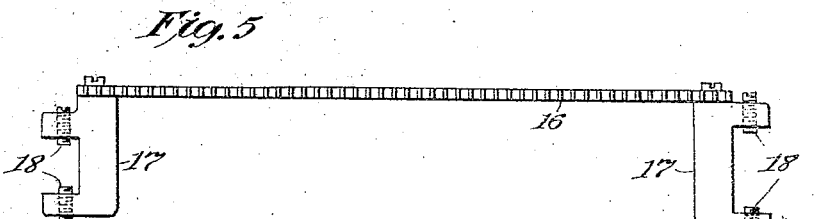
Witnesses:
Frank D. Lewis
Delos Holden
Inventor:
Thomas A. Edison
By Frank L. Dyer
Atty.

UNITED STATES PATENT OFFICE.

THOMAS A. EDISON, OF ORANGE, NEW JERSEY, ASSIGNOR TO NEW JERSEY PATENT COMPANY, OF WEST ORANGE, NEW JERSEY, A CORPORATION OF NEW JERSEY.

FEED MECHANISM FOR PHONOGRAPHS AND OTHER MACHINES.

936,267.    Specification of Letters Patent.    Patented Oct. 5, 1909.

Application filed January 17, 1907. Serial No. 352,720.

*To all whom it may concern:*

Be it known that I, THOMAS ALVA EDISON, a citizen of the United States, residing at Llewellyn Park, Orange, in the county of Essex and State of New Jersey, have invented certain new and useful Improvements in Feed Mechanism for Phonographs and other Machines, of which the following is a description.

My invention relates to mechanical movements and more particularly to means for imparting a progressive movement to the carriage which carries the reproducer or recorder of a phonograph, whereby the same is fed transversely with respect to the direction of movement of the surface of the record and the stylus traces upon the same a spiral path. In devices of this character it has been the usual practice heretofore to provide a feed screw cut with a very fine thread, such as one hundred threads to the inch, and to secure to the carriage a spring arm provided with a nut for engagement with said screw thereby feeding the carriage forward a distance of one one-hundredth of an inch for each revolution of the feed screw. It has sometimes seemed advantageous to feed the carriage at a slower rate of speed than this, but for mechanical reasons the use of a screw of finer pitch is not desirable.

According to the present invention a very low rate of travel may be obtained for the carriage, such for example, as would be produced by a feed screw having two hundred threads to the inch and operating in the usual way; and in fact, if desired, this rate of feed may be obtained from a feed screw having less than one hundred threads to the inch. This result is accomplished by substituting for the feed nut referred to a worm gear carried by the carriage in engagement with the feed screw, being pivoted on an axis perpendicular thereto, and providing means which rotates with the worm gear, as, for example, a pinion, and fixed means which coöperates with said rotating means for imparting progressive movement to the carriage, for example, a rack fixed to the body of the instrument with which the pinion meshes. By varying the relative sizes of the worm gear and pinion, any desired rate of feed of the carriage may be obtained. When the pitch diameter of these two gears is the same, and a feed screw of one hundred threads to the inch is used, the rate of feed of the carriage will be one two-hundredths of an inch for each revolution of the feed screw.

With these ends in view my invention consists of the features hereinafter set forth and claimed.

Referring to the accompanying drawings, Figure 1 is a front elevation of a phonograph provided with a feed device constructed in accordance with my invention; Fig. 2, is a section on line 2—2 of Fig. 1; Fig. 3, is a detail front view of the spur gears which are carried by the traveling carriage and the fixed rack which coöperates therewith; Fig. 4 is a section on line 4—4 of Fig. 2, and Fig. 5 is a plan view of the rack and supporting clamps for securing the same to the phonograph body.

Corresponding parts are designated by the same reference numerals in the several views.

The phonograph shown is of the Edison type and comprises the usual body 1 and carriage 2 which slides upon the back rod 3. The mandrel 4 is mounted upon the main shaft 5 which is provided with a feed screw 6 which, as has been explained, is ordinarily made of a pitch of one one-hundredth of an inch, although a screw of different pitch may be used, as has been indicated. In engagement with the thread of the screw 6 so as to be rotated thereby, is a worm gear 7 journaled on a pin or stud 8 which is perpendicular to the axis of the shaft 5 and is held in a socket in the block 9 by a set screw 10. The worm gear 7 is formed with an integral sleeve 11 to which is secured a spur gear or pinion 12. Meshing with the gear 12 is a second pinion 13 which is journaled on a pin 14 held in a socket in the block 9 by a set screw 15. The pinion 13 meshes with the teeth of a rack 16 which is secured to the body of the phonograph in any suitable manner, as, for example, by being secured at each end to plates 17, 17 provided with clamping screws 18, which are adapted to clamp upon certain projections with which phonographs of the type shown are provided.

The block 9 is supported by a flat spring arm 19 which is secured at its rear end by screws 20 to a portion of the traveling carriage 2. The free end of the spring 19 is forked and the prongs 21 are removably fitted into the horizontal grooves 22 formed in the lateral faces of the block 9, whereby the said block with the gears carried thereby may be readily detached from the traveling carriage of the phonograph, thus allowing the substitution of a block provided with an ordinary feed nut for engagement with the screw 6 for feeding the carriage 2 in the usual manner.

It is obvious that the gear 13 is merely an idler for causing the carriage to be fed in the proper direction with the screw shown. By using a screw which is oppositely threaded, this idler can of course be dispensed with.

While I have described my invention as applied to a phonograph for producing the desired feed of the traveling carriage, it is obviously not limited to such use, and may be applied to any mechanism whatever for converting rotary movement into progressive lineal movement.

Having now described my invention, what I claim as new and desire to secure by Letters Patent, is as follows:

1. A device of the class described comprising a feed screw and movable carriage in combination with a spring supported worm gear carried by the carriage in engagement with said feed screw, means rotating with the worm gear, and fixed means coöperating with said rotating means for imparting progressive movement to said carriage, substantially as set forth.

2. A device of the class described comprising a feed screw and movable carriage in combination with a flat spring secured at one end to said carriage, a worm gear supported by the free end of said spring and engaging said feed screw, means rotating with the worm gear, and fixed means coöperating with said rotating means for imparting progressive movement to said carriage, substantially as set forth.

3. A device of the class described comprising a feed screw, a rack, a movable carriage, a member removably secured to the said carriage, a worm wheel rotatable on said member, a pinion driven from the worm wheel and adapted to engage the said rack, substantially as set forth.

4. In a device of the class described, the combination of a feed screw, a stationary rack, a movable carriage, a flat spring secured at one end to said carriage, a member provided with a recess adapted to receive the free end of said spring, a worm gear engaging the said feed screw and a pinion driven from the said worm gear and coöperating with the said rack to impart movement to the carriage, substantially as set forth.

5. A device of the class described comprising a revoluble feed screw, a stationary rack, a movable carriage, a member attached to said carriage, a member provided with a recess adapted to removably engage said first named member, and a gear train carried by said removable member meshing with said feed screw and said rack to impart movement to the carriage, substantially as set forth.

6. A device of the class described comprising a revoluble feed screw, a stationary rack, a movable carriage, a member attached to said carriage, said member being forked at its free end, a block provided with recesses adapted to be removably engaged by the prongs of the fork to support the block, and gear means carried by said block meshing with said feed screw and said rack to impart movement to the carriage, substantially as set forth.

7. In a device of the class described, a member formed with parallel grooves on its opposite sides adapted to slidably receive stationary holding members to removably support the grooved member, and a gear train carried by said grooved member, substantially as set forth.

8. In a device of the class described, a member formed with parallel grooves on its opposite sides adapted to slidably receive stationary holding members to removably support the grooved member, and a worm gear rotatably mounted on said grooved member, a pinion secured to the worm gear, and a second pinion carried by the said grooved member and meshing with the first pinion, substantially as set forth.

This specification signed and witnessed this 11th day of January 1907.

THOS. A. EDISON.

Witnesses:
FRANK L. DYER,
ANNA R. KLEHM.